United States Patent [19]

Bussink et al.

[11] Patent Number: 4,771,096

[45] Date of Patent: * Sep. 13, 1988

[54] POLYMER MIXTURE COMPRISING A POLYPHENYLENE ETHER AND OPTIONALLY A POLYSTYRENE AND/OR A RUBBER-MODIFIED POLYSTYRENE, AND ARTICLES FORMED THEREFROM

[75] Inventors: Jan Bussink, CT Bergen op Zoom; Roelof van der Meer, AZ Bergen op Zoom, both of Netherlands

[73] Assignee: General Electric Company, Selkirk, N.Y.

[*] Notice: The portion of the term of this patent subsequent to May 26, 2004 has been disclaimed.

[21] Appl. No.: 594,494

[22] Filed: Mar. 29, 1984

[30] Foreign Application Priority Data

Apr. 12, 1983 [NL] Netherlands ................. 8301284

[51] Int. Cl.$^4$ ........................................... C08L 71/04
[52] U.S. Cl. ................................ 524/508; 524/494; 525/68; 525/98; 525/132; 525/905
[58] Field of Search ............... 525/68, 92, 132, 905; 524/508, 494

[56] References Cited

U.S. PATENT DOCUMENTS 4,373,055  2/1983  Haaf et al. .................... 525/905
4,389,516  6/1983  Sugio et al. ................... 428/458

OTHER PUBLICATIONS

Japan 20,379; published May 24, 1974.

Primary Examiner—Jacob Ziegler
Attorney, Agent, or Firm—Hedman, Gibson, Costigan & Hoare

[57] ABSTRACT

Polyphenylene ethers may show the property that their molecular weight increases considerably upon extrusion. This increase of the molecular weight leads to less good flow properties. It has been found that the addition of a conjugated, non-aromatic diene compound or of a dienophilic compound suppresses the increase of the molecular weight under extrusion.

7 Claims, No Drawings

POLYMER MIXTURE COMPRISING A POLYPHENYLENE ETHER AND OPTIONALLY A POLYSTYRENE AND/OR A RUBBER-MODIFIED POLYSTYRENE, AND ARTICLES FORMED THEREFROM

The invention relates to a polymer mixture comprising a polyphenylene ether and optionally a polystyrene and/or a rubber-modified polystyrene.

Polyphenylene ether and mixtures of polyphenylene ethers with polystyrene and/or with a rubber-modified polystyrene are known per se. For this purpose reference may be made to the U.S. Pat. No. 3,306,874 and 3,383,435.

The thermoplastic polyphenylene ethers are usually prepared by oxidative coupling, in the presence of a copper-amine complex, of a substituted phenol compound. Copper-amine complexes derived from primary, secondary and/or tertiary amines may be used.

Polyphenylene ethers prepared while using copper-amine complexes are usually mixed with polystyrene or with rubber-modified polystyrene to polymer mixtures which can be extruded. Some polymer mixtures comprising polyphenylene ethers, upon extrusion from the melt, show the property that the molecular weight becomes much larger. This has for its effect that the flow properties of the polymer mixture are adversely influenced so that shaping by means of injection moulding becomes more difficult, and, for example, has to be carried out at higher temperatures.

It has quite unexpectedly been found that this increase of the molecular weight under extrusion conditions can be suppressed by incorporating certain compounds in the polymer mixture.

A polymer mixture which comprises a polyphenylene ether and optionally a polystyrene and/or a rubber-modified polystyrene, characterized in that, calculated with respect to the quantity of the polyphenylene ether present in the polymer mixture, the polymer mixture comprises 0.1–5% by weight of one or more of the following components: a conjugated, non-aromatic diene compound, a dienophilic compound or a precursor of a diene or dienophilic compound or the reaction product of one or more of the constituents of the polymer mixture.

Diene compounds and dienophilic compounds are to be understood to mean the compounds known as such for Diels-Alder reactions (see, for example, Fieser and Fieser, Advanced Organic Chemistry, New York, 1963, pp. 206–211).

Examples of suitable conjugated, non-aromatic diene compounds are cyclopentadiene and 1,3-cyclohexadiene; suitable monofunctional dienophilic compounds are, for example, maleimide, N-alkyl- or N-arylmaleimides, acenaphthylene, indene, cinnamaldehyde, N-alkyl- or N-arylmaleic acid amides, maleic acid anhydride, naphthoquinone and 2-methyl-1,4-naphthoquinone. Suitable precursors of diene compounds and/or dienophilic compounds are acenaphthenol, methendic anhydride, i.e. 5-norbornene-1,2-dicarboxylic acid anhydride with a methyl substituent, dicyclopentadiene or mixtures of maleic acid anhydride and a primary alkyl- or arylamine. Maleimides, maleic acid amides or acenaphthylene are preferably used since these compounds or the products formed therefrom are also stable at temperatures above 300° C.

The addition of bismaleimides to polyphenylene ether comprising compositions is known from U.S. Pat. No. 4,389,516. The addition of bismaleimides results in cross linkable compositions i.e. compositions which show an increase of molecular weight. It has been experimentally established that such bismaleimides result in an increase of molecular weight during extrusion of the melt. Such bismaleimides are excluded from the scope of the claims.

Stabilization of polyphenylene ethers against oxidation is known per se, for example, from U.S. Pat. No. 3,375,228. According to this Patent Specification, the polyphenylene ether is first treated to obtain hydroxyl groups in the polymer, after which the formed hydroxyl groups are reacted with a material which yields substituents in the polymer which can withstand thermal oxidation. Thermal oxidation of polyphenylene ether results in the polymer becoming dark and brittle.

However, extrusion is usually carried out under substantially oxygen-free conditions. Thermal oxidation then is not to be expected.

The known method of stabilizing polyphenylene ethers against thermal oxidation is usually carried out by treating the polyphenylene ether in solution with a reagent (see the examples of U.S. Pat. No. 3,375,228).

The polymer mixtures according to the invention on the contrary are prepared by melt-mixing, in which a reaction occurs between the diene or the dienophilic compound and the polyphenylene ether. Such a method may be carried out as follows: first the polyphenylene ether and the diene or the dienophilic compound (or a precursor of one of them) are mixed with each other in the dry state. The dry mixture is further mixed in the melted state in an extruder in which the actual stabilization of the polyphenylene ether occurs.

The polymer mixtures according to the invention comprise a polyphenylene ether. Polyphenylene ethers are known compounds. They are described, for example, in U.S. Pat. Nos. 3,306,874, 3,306,875, 3,257,357 and 3,257,358. Polyphenylene ethers are to be understood to mean homopolymers and/or copolymers. Homopolymeric or copolymeric polyphenylene ethers are preferably used which comprise units derived from 2,6-dimethyl phenol.

The polymer mixtures according to the invention may comprise polystyrene or rubber-modified polystyrene. Suitable are also polymers derived from substituted styrene compounds and copolymers, for example, styrene-acrylonitrile copolymers, styrene-butadiene copolymers, styrene-acrylonitrile-butadiene copolymers.

The polymer mixtures according to the invention may comprise the polyphenylene ether and the polystyrene in any relative quantity: the ratio of polyphenylene ether to polystyrene preferably is between 1:20 and 20:1, more in particular between 1:5 and 10:1.

In addition to the constituents mentioned hereinbefore, the polymer mixture according to the invention may comprise all auxiliary substances known in combination with polyphenylene ethers, for example, means to improve the impact strength, for example, block copolymers, means to give the polymer mixture flame-retarding properties, fillers, including glass fibers, antistatics, pigments etc.

The invention will be described with reference to the ensuing specific examples:

EXAMPLE I

In this example, samples were prepared from poly(2,6-dimethylphenylene) ether (PPE) and from the same polymer mixed with a diene or dienophilic compound as indicated in the table hereinafter. These (powdered) samples were treated thermally while excluding oxygen: they were pressed between two Teflon®-coated aluminium foils, namely 1 minute at a pressure of 20 tons, 1 minute at a pressure of 4 tons and 1 minute at a pressure of 8 tons, always at a temperature of 285° C. The resulting foil was quenched in water. The intrinsic viscosity of the resulting PPE-foils was determined by means of a Ubelohde viscosimeter (T=25° C.; CHCL$_3$ as a solvent).

The melt viscosity of the samples was also determined. The results obtained are recorded in Table A hereinafter. In this Table, the properties of non-compressed PPE are recorded sub $A^1$ and those of PPE compressed to a foil are recorded sub $A^2$.

Non-compressed PPE ($A^1$) has a lower intrinsic viscosity than the PPE compressed to foil at elevated temperature ($A^2$). By adding a compound according to the invention, as indicated in Table A, said increase of the intrinsic viscosity can be avoided (Samples B to I).

TABLE A

| Composition (parts by weight) | $A^1$ | $A^2$ | B | C | D | E | F | G | H | I |
|---|---|---|---|---|---|---|---|---|---|---|
| PPE | 100 | 100 | 99.5 | 99 | 98 | 96 | 98 | 98 | 98 | 98 |
| N—methylmaleimide | 0 | 0 | 0.5 | 1.0 | 2.0 | 4 | — | — | — | — |
| Methendic anhydride | — | — | — | — | — | — | 2.0 | — | — | — |
| Cyclo pentadiene | — | — | — | — | — | — | — | 2.0 | — | — |
| Maleic acid anh. + propylamine | — | — | — | — | — | — | — | — | 1.0 + 1.0 | — |
| Dicyclopentadiene | — | — | — | — | — | — | — | — | — | 2.0 |
| Properties | | | | | | | | | | |
| Intrinsic viscosity (ml/g) | 57 | 65 | 58 | 53 | 51 | 50 | 58 | 57 | 58 | 59 |
| Melt viscosity 325° C., 1000 s$^{-1}$ (Pa · s) | — | 575 | 450 | 350 | 245 | 145 | — | — | — | — |

EXAMPLE II

The samples A to G recorded in Table B hereinafter were prepared by mixing the recorded constituents in the recorded quantities with each other. The resulting mixtures were extruded: the samples A to D in a double-blade extruder of which the various heating zones were adjusted at 175°, 255°, 290°, 290°, 280° and 270° C., while the blade was rotated at a speed of 300 rpm; the samples E, F and G were extruded at an adjusted temperature of 250° C., speed 300 rpm. The melt viscosity, the melt flow index and the spiral flow length of the resulting extrudates were determined. The values found are recorded in Table B.

TABLE B

| | A* | B | C* | D | E* | F | G |
|---|---|---|---|---|---|---|---|
| Composition (parts by weight) | | | | | | | |
| Poly (2,6-dimethyl-phenylene) ether | 32 | 32 | 35 | 35 | 29 | 29 | 29 |
| Rubber-modified polystyrene | 64 | 64 | 53 | 53 | 67 | 67 | 67 |
| Styrene-butadiene blockcopolymer (unsaturated) | 5 | 5 | — | — | 5 | 5 | 5 |
| Styrene-butadiene blockcopolymer (saturated) | — | — | 12 | 12 | — | — | — |
| Polyethylene | 1.5 | 1.5 | 1.5 | 1.5 | 2 | 2 | 2 |
| Zn O | 0.15 | 0.15 | 0.15 | 0.15 | 0.15 | 0.15 | 0.15 |
| Zn S | 0.15 | 0.15 | 0.15 | 0.15 | 0.15 | 0.15 | 0.15 |
| Phosphite stabilizer | 0.9 | 0.9 | 0.3 | 0.3 | 0.5 | 0.5 | 0.5 |
| Mineral oil | — | — | — | — | 1.5 | 1.5 | 1.5 |
| TiO$_2$ | — | — | — | — | 1 | 1 | 1 |
| N—methylmaleic acid amide | — | 1 | — | 1 | — | — | — |
| N—phenyl maleic acid amide | — | — | — | — | — | 1 | — |
| Acenaphtylene | — | — | — | — | — | — | 1 |
| Properties | | | | | | | |
| Thermal deformation temperature 1.82 MPa; 3.22 mm bar (°C.) | 114 | 113 | 120 | 118.5 | 112 | 113 | 110.5 |
| Melt viscosity 282° C., 1500 s$^{-1}$ (Pa · s) | 175 | 165 | 195 | 180 | 165 | 160 | 155 |
| Melt flow-index 280° C., 50N (g/min) | 6.2 | 6.7 | 7.0 | 11.6 | 5.3 | 8.1 | 5.6 |
| Spiral flow length 265° C. (cm) | 29.5 | 32.5 | 20.5 | 27.5 | | | |
| 280° C. (cm) | | | | | 57 | 61.5 | 64.5 |

*remark: the examples A, C and E comprise no diene compound or dienophilic compound.

It may be seen from the results of Table B that the addition of N-methylmaleic acid amide, N-phenylmaleic acid amide or of acenaphthylene leads to better flow properties. This is expressed in a lower value for the melt viscosity and a higher value for the melt flow index and the spiral flow length. The thermal deformation temperature of the various samples is substantially equal.

EXAMPLE III

Two samples were prepared having a composition as indicated in Table C; sample A according to the invention with methendic anhydride as a precursor of a diene/dienophilic compound and sample B without such a compound. The samples were prepared by mixing the individual constituents. Extrusion was then carried out in a double-blade extruder with the following temperature adjustments in the various zones: 280° C., 280° C., 280° C., 290° C., 295° C. (300 rpm). Test pieces were manufactured from the resulting extrusion samples by injection moulding. The thermal deformation temperature, the melt viscosity and the length of the flow spiral of the test pieces were determined. Moreover a few mechanical properties were measured. The results obtained are recorded in Table C.

TABLE C

| Sample | A | B* |
|---|---|---|
| Composition (parts by weight) | | |
| poly(2,6-dimethylphenylene) ether | 32 | 32 |
| rubber-modified polystyrene (10% rubber) | 64 | 64 |
| Unsaturated styrene-butadiene-styrene blockcopolymer | 5 | 5 |
| Polyethylene | 1.5 | 1.5 |
| ZnO + Zn S | 0.3 | 0.3 |
| Fosphite stabilizer | 0.9 | 0.9 |
| Methendic anhydride | 1 | — |
| Properties | | |
| Thermal deformation temperature 1,82 N/mm² ASTM D 648° C. | 116 | 116.5 |
| Melt viscosity, 282° C., 1500 s⁻¹ Pa · s | 187 | 205 |
| Spiral flow length 295° C. mm | 474 | 423 |
| Notch impact value according to Izod with notch ASTM D256 J/m | 280 | 275 |
| Tensile strength DIN 53455 N/mm² | 55.2 | 54.3 |
| Elongation upon fracture DIN 53455 % | 22 | 26 |

*For comparison

It may be seen from the Table that the addition of methendic anhydride improves the flow properties without any noteworthy change of mechanical properties occurring.

EXAMPLE IV

Two samples of glass fibre-filled polymer mixtures were prepared: sample A with a dienophilic compound according to the invention and for comparison sample B without a dienophilic compound. The resulting samples were extruded and injection moulded. The mechanical properties and the flow properties of the samples were determined. The samples according to the invention showed a considerable improvement of the flow properties at a slightly lower value for the mechanical properties. The composition of the samples and the flow properties found are recorded in Table D below.

TABLE D

| Sample | A | B* |
|---|---|---|
| Composition (parts by weight) | | |
| Poly(2,6-dimethylphenylene) ether | 35 | 35 |
| Rubber-modified polystyrene | 36 | 36 |
| Glass fibres | 30 | 30 |
| Polyethylene | 1.5 | 1.5 |
| ZnO + ZnS | 0.2 | 0.2 |
| Phosphite stabilizer | 0.3 | 0.3 |
| N—phenylmaleic acid amide | 2.0 | — |
| Properties | | |
| Thermal deformation temperature 1.82 MPa °C. | 140.5 | 142.5 |
| Melt viscosity 282° C.; 1500 s⁻¹ Pa · s | 253 | 295 |
| Flow spiral length 300° C. cm | 52 | 42 |
| Impact strength according to Izod without a notch J/m | 87 ± 3 | 96 ± 2 |
| Tensile strength upon fracture MPa | 87 | 96 |

EXAMPLE V

Four samples were prepared: A* without N-phenylmaleamic acid, B, C and D with this compound. All four samples comprised an agent for providing flame-retarding properties (an organic phosphate compound). The composition of the matrix was as follows: 55 parts by weight of PPE, 45 parts by weight of rubber-modified polystyrene, 1.5 parts by weight of polyethylene, 0.15 parts by weight of ZnO, 0.15 parts by weight of ZnS, 0.15 parts by weight of ZnS, 4.5 parts by weight of diphenylcresylphosphate, 0.5 parts by weight of organic phosphite stabilizer. The quantity of N-phenylmaleamic acid is indicated in Table E. The various constituents were mixed and the resulting mixture was extruded in a double-blade extruder at 285° C. and 300 rpm. The properties of the extrudate are recorded in Table E. From this it may be seen that the addition of N-phenylmaleamic acid to PPE mixtures with flame-retarding additives results in better flow properties.

TABLE E

| Sample | A* | B | C | D |
|---|---|---|---|---|
| N—phenylmaleic acid (parts by weight) | — | 1.5 | 2 | 3 |
| Properties | | | | |
| Thermal deformation temperature °C. | 123 | 120.5 | 120.5 | 120.0 |
| Melt viscosity 282° C.; 1500 s⁻¹ Pa · s | 210 | 180 | 175 | 165 |
| Flow spiral length T = 290° C. cm | 49 | 57 | 57,5 | 61 |
| Flame extinction according to UL 94 total time 5 rods of 1/16 inch, approx. 1.5 mm. 10 × ingnited s | 81 | 68 | 103 | 92 |
| UL 94: | V1 | V1 | V1 | V1 |

*for comparison

EXAMPLE VI

A mixture was prepared consisting of 70 parts by weight of PPE and 30 parts by weight of rubber-modified polystyrene. The resulting mixture was divided into four equal parts. To each part a different quantity of N-methyl maleamic acid was added (as recorded in Table F). The mixtures were extruded (310° C.). The flow properties of the resulting extrusion products were determined (see Table F). It may be seen from Table F that an increasing content of N-methylmaleamic acid leads to a further improvement of the flow properties.

TABLE F

| Sample | A* | B | C | D |
|---|---|---|---|---|
| N—methylmaleamic acid (parts by weight) | 0 | 0.625 | 1.25 | 2.5 |
| Properties | | | | |
| Melt viscosity T = 300° C., 1500 s⁻¹ Pa · s | 465 | 360 | 350 | 295 |
| Flow spiral length T = 295° C. cm | 27.5 | 38.5 | 39.5 | 46.5 |
| Increase flow spiral length with regard to reference A* % | — | 40 | 43.5 | 69.1 |

*for comparison

We claim:
1. A polymer mixture comprising:
 (a) a polyphenylene ether resin or a mixture of polyphenylene ether resin and polystyrene resin; and
 (b) 0.1 to 5.0% by weight based upon the weight of said polyphenylene ether resin of a monofunctional dienophilic compound.

2. A polymer mixture as claimed in claim 1, characterized in that the mixture further comprises 5-40% by weight of glass fibres.

3. A polymer mixture as claimed in claim 1, characterized in that the mixture also comprises an agent to give the mixture flame-retarding properties.

4. A polymer mixture as claimed in claim 1, characterized in that the mixture also comprises a block copolymer having styrene blocks and butadiene blocks.

5. Articles formed from the polymer mixture as claimed in claim 1.

6. A polymer mixture as in claim 1 wherein said dienophilic compound is selected from the group consisting of maleimide, N-alkylmaleimide, N-arylmaleimide, acenaphthylene, indene, cinnamaldehyde, maleic acid anhydride, N-alkylmaleic acid anhydride, N-arylmaleic acid anhydride, N-arylmaleic acid amide, naphthoquinone, and 2-methyl-1,4-naphthoquinone.

7. A polymer mixture as in claim 1 wherein said polystyrene resin is rubber-modified polystyrene.

* * * * *